United States Patent
Wang et al.

(10) Patent No.: US 6,641,852 B2
(45) Date of Patent: Nov. 4, 2003

(54) METHOD OF PRODUCING VEGETARIAN LACTIC ACID AND NON-ALCOHOLIC BEVERAGES WITH KOJI-SACCHARIFIED HIGH-SUGAR SYRUP

(75) Inventors: Tseng-Hsing Wang, Taipei (TW); Hao-Sheng Lin, Taipei (TW); Tzann-Feng Lin, Taipei (TW)

(73) Assignee: Taiwan Tobacco & Liquor Corporation, Taipei (TW)

( * ) Notice: Subject to any disclaimer, the term of this patent is extended or adjusted under 35 U.S.C. 154(b) by 0 days.

(21) Appl. No.: 10/000,906

(22) Filed: Nov. 15, 2001

(65) Prior Publication Data

US 2003/0091692 A1 May 15, 2003

(51) Int. Cl.⁷ .................................................. A23L 1/20
(52) U.S. Cl. .......................................... 426/46; 426/52
(58) Field of Search ............................ 426/48, 49, 52, 426/658, 655, 44, 590; 435/95, 96, 98, 99, 100, 256.1, 256.6, 256.8

(56) References Cited

U.S. PATENT DOCUMENTS 4,756,912 A * 7/1988 Mitchell et al. ............... 426/28

OTHER PUBLICATIONS

Steinkraus, K. Handbook of Indigenous Fermented Foods. "Japanese Amasake". 1996 Marcel Dekker Inc.; p. 480–481.*

* cited by examiner

Primary Examiner—Keith Hendricks
(74) Attorney, Agent, or Firm—Alan D. Kamrath; Rider Bennett, LLP

(57) ABSTRACT

This invention relates to a method for producing a vegetarian lactic acid beverage similar to yogurt (Drinking yogurt). The method comprises producing koji; producing koji-saccharified high-sugar syrup from the koji; adding soybean protein to the koji-saccharified syrup; sterilizing, inoculating and fermenting the resulting koji-saccharified syrup and soybean protein mixture to obtain a vegetarian lactic acid beverage. The beverage obtained has unique flavor and excellent health-promoting effects. The present invention also relates to the use of said koji-saccharified syrup as a sweetening agent for non-alcoholic beverages.

6 Claims, No Drawings

METHOD OF PRODUCING VEGETARIAN LACTIC ACID AND NON-ALCOHOLIC BEVERAGES WITH KOJI-SACCHARIFIED HIGH-SUGAR SYRUP

BACKGROUND OF THE INVENTION

1. Field of the Invention

This invention relates to a method for producing a vegetarian lactic acid beverage, particularly a vegetarian lactic acid beverage similar to yogurt (Drinking yogurt). The method uses steamed rice as the raw material and edible mold to produce koji (a starter) in a conventional koji-preparation method. After the preparation of the edible koji, the method comprises the steps of producing koji-saccharified high-sugar syrup from the koji; mixing the koji-saccharified syrup with soybean protein and then sterilizing the mixture; inoculating the resulting product with lactic acid bacteria to ferment the product and then obtaining a vegetarian lactic acid beverage. The present invention also relates to the use of said koji-saccharified high-sugar syrup as a sweetening agent in non-alcoholic beverages.

2. Description of the Related Art

Sweet fermented rice and zhuo-jiu (unstrained wine) are traditional healthy beverages for people in China, Japan and Korea where rice is the staple food. Sweet fermented rice and zhuo-jiu (unstrained wine) contain plentiful oligosaccharides, amino acids, unsaturated fatty acids and minerals that are essential nutrients for human beings. Moreover, they also contain distinctive healthy components produced by edible mold. Fermented lactic acid milk including yogurt that has an intestine-regulating effect is a very common healthy beverage in Europe and America where animal husbandry has been well developed. The present invention combines the techniques for preparing the oriental and western traditional fermented foods to produce a vegetarian lactic acid beverage that has multiple health-promoting effects.

"Koji" is a fermenting starter produced by propagating molds on the grains to produce enzymes. Depending on the cultivating material, rice, wheat, soybean or bran, being used, the koji can be classified as rice koji, wheat koji, soybean koji or bran koji. The koji can also be named as wine koji, miso koji, soy sauce koji, etc., depending on the use of the koji.

Examples of the common molds used in food are listed below:

Genus Aspergillus has been widely used in the brewing industry. It can release a variety of enzymes. Generally, the amylase titer and protease titer of genus Aspergillus are higher than those of other filamentous fungi. *Aspergillus oryzae* is important in the brewing of sake, miso, soy sauce, sweet wine, etc., and it can produce amylase and protease with high activity and other digesting enzymes, such as lipase, invertase, cellulase, trypsin and so on. The Aspergillus strains used for making miso and soy sauce are those strains that can produce a large amount of spores and have high proteolytic enzyme activity. However, the Aspergillus strains used for producing sake are the strains having particularly high saccharifying enzyme activity.

Genus Rhizopus is another mold related to brewing and is capable of hydrolyzing protein and starch, but its proteolytic activity is lower than that of the genus Aspargillus. Genus Rhizopus can release pectinase, produce organic acids such as lactic acid and fumaric acid and is often used for the production of sweet fermented rice.

Genus Monascus usually presents in bright red or purple color and is capable of producing high-activity amylase. The representative species of Monascus are *Monascus purpureus* and *Monascus anka*. Genus Monascus is used to make red rice wine (Anchiew is included) and red fermented bean curd.

Genus Aspergillus may produce peptides that have the effects of reducing blood lipids, blood pressure and blood sugar (Kim, An Tsung, 1999, Japanese Brewing Association Journal). *Monascus anka* may produce anti-oxidants and cholesterol-lowering components (Lin, Zahn Feng, 1999, *Monascus anka*-The Magic Healthy Food In 21th Century, Tien Long Publisher, Taipei). *Rhizopus oryzae* may produce anti-oxidants and vitamin $B_{12}$ (Shei, I. C. et al., 2000, Food Sci. Agri. Chem. 2(1): 35–40).

Scientists have conducted an enormous amount of research on soy protein over the past 20 years. Research on soy protein's ability to reduce the cholesterol levels, and thus the risk of heart disease, has led the U.S. Food and Drug Administration (FDA) approval of a health claim on the association between consumption of soy protein and reduced risk of coronary heart disease in 1999. In addition to the benefits of soy protein in heart disease, research is also ongoing on whether soy protein plays a role in providing health benefits in the areas of menopause, bone health and cancer. The role of isoflavones (a class of nonsteroidal estrogens called phytoestrogens) in modest amounts of ingested soy protein may explain some of the biololgical effects of soy protein. Isoflavones can act as estrogen agonists or antagonists and they are weakly estrogenic ($10^{-2}$ to $10^{-3}$-fold) when compared with estradiol or estrone, the principle circulating estrogens of most mammals. Therefore isoflavones are expected to have the potential for physiologic effects. More importantly, isoflavones possess a myriad of potent inhibitor of protein tyrosine kinases and influences growth factors that regulate cell proliferation expands the biological potential for their action (Kenneth D R Setchell, 1998, Am. J. Clin. Nutr. 68 (suppl): 1333S-1346S). Moreover, lecithin and polyunsaturated fatty acids in soybean also have a variety of physiological functions (Sirtori, C., Lovati, M., Manzoni, C., Monstti, M., and Pazzuccone, F., J. Nutr. 125: 598–605).

SUMMARY OF THE INVENTION

The object of the present invention is to provide a method for producing a vegetarian lactic acid beverage which comprises the steps of producing a 15–30° Brix koji-saccharified high-sugar syrup from the koji prepared by using edible mold and rice; mixing the koji-saccharified syrup and soybean protein and sterilizing the syrup and protein mixture; adding lactic acid bacteria to ferment the sterilized mixture; and optionally adding 15–30° Brix koji-saccharified high-sugar syrup, oligosaccharides, food stabilizing agents or essences for flavoring. The edible mold is preferably selected from genus Aspergillus, genus Rhizopus or genus Monascus. More preferably, the edible mold is *Aspergillus oryzae, Rhizopus oryzae,* or *Monascus purpureus.* The koji-saccharified high-sugar syrup is prepared by inoculating steamed rice with edible mold to form koji, mixing the koji with water to effect a saccharification and then separating the liquid syrup from the solid residue, where said saccharification is performed at 30° C. for 12–24 hours or at a higher temperature of above 50° C. for 2–6 hours. The lactic acid fermentation is conducted at 37–45° C. for 4–8 hours using a 2–4% concentration of *Streptococcus thermophillus* and *Lactobacillus bulgaricus.* The soybean protein is selected from isolated soybean protein, defatted soybean flour or concentrated soybean protein and the amount added to the syrup is 5–10% by weight based on the weight of the koji-saccharified syrup.

Another object of the present invention is to provide a sweetening agent for non-alcoholic beverages, such as low-sugar juice beverage or healthy vinegar beverage, which was prepared by inoculating steamed rice with edible mold to make koji, mixing the koji with water to cause saccharification and then the liquid syrup is separated from the solid residue to obtain a 15–30° Brix koji-saccharified high-sugar syrup. The edible mold is preferably selected from genus Aspergillus, genus Rhizopus or genus Monascus. More preferably, the edible mold is *Aspergillus oryzae, Rhizopus oryzae,* or *Monascus purpureus.*

DETAILED DESCRIPTION OF THE IVNENTION

Vegetarian lactic acid beverage made by the present invention does not have any animal fat and contains components that have widespread health-promoting effects on human beings, including healthy components derived from koji mold (e.g. anti-oxidants, cholesterol-lowering components, blood sugar-lowering components and blood lipids-lowering components) and soybean isoflavones.

The vegetarian lactic acid beverage according to the present invention not only contains the living lactic acid bacteria but also the oligosaccharides derived from koji. Accordingly, the beverage may provide double intestine-regulating effects by supplying lactic acid bacteria and simultaneously improving the growth of beneficial microorganisms in the intestine by the oligosaccharides.

One of characteristic features of the present invention resides in the use of the saccharified syrup produced from the koji as a source of carbon and other nutrients for the growth and fermentation of the lactic acid bacteria to enable the subsequent lactic acid fermentation to proceed successfully.

Any edible mold may be used as the saccharifying mold for brewing so long as it can produce amylolytic enzymes, proteolytic enzymes and has good flavor. The major brewers' molds used in China, Japan and Korea are genera Aspergillus, Rhizopus and Monascus. The various species of each of the genera have similar saccharifying action. The main difference among the various species is the difference of the flavor. Therefore, all the saccharifying molds are applicable to the present invention.

The protein content of the beverage according to the present invention is increased by the addition of soybean protein. There is no limit on the sources of the soybean protein. The key point is to ensure that the fermenting mash has adequate protein contents. Examples of the sources of soybean protein are: 1. isolated soybean protein that is produced by extracting sugar from defatted soybean meal with water, and then precipitating and drying the defatted soybean meal; 2. soybean flour that is obtained by pulverizing defatted soybean meal and pelleting; 3. concentrated soybean protein that is prepared by extracting sugar from defatted soybean meal with water and then drying the defatted soybean meal; 4. concentrated soybean protein that is obtained by extracting sugar from defatted soybean meal with alcohol, and then removing the solvent from the defatted soybean meal. The soybean protein has an isoelectric point close to that of milk casein, and it may coagulate after lactic acid fermentation.

The purpose of using the isolated soybean protein obtained by the foregoing process in the present invention is to prevent the formation of soybean odor and astringent taste that might be generated during fermentation if untreated soybean is used to increase the protein content of the finished beverage.

Moreover, sucrose or fructose syrup is usually added during the preparation of yogurt made from cow's milk. However, in the present invention, the 15–30° Brix koji-saccharified syrup is used as the major sweetening agent.

The koji-saccharified syrup produced from koji contains oligosaccharides, peptides and other healthy components that are beneficial to human beings. In addition, the koji-saccharified syrup has different flavors and healthy components depending upon the types of koji (peka, rice koji, or anka) used. The present invention also invented the use of the koji-saccharified syrup, that was usually used for brewing, as a sweetening agent, in non-alcoholic beverages.

The detailed method for the production of the vegetarian lactic acid beverage includes the following steps:

(1) Preparing Koji

The steamed rice is inoculated with seed koji of edible mold (*Rizopus oryzae, Aspergillus oryzae* or *Monascus purpureus*) to produce koji by a traditional koji-preparation method for sweet fermented rice or zhuo-jiu (unstrained wine). The seed koji is preferably added to the steamed rice at a ratio of 10–20 wt % based on the weight of raw rice. *Aspergillus oryzae* has a strong koji flavor. When it is employed, the gin-njuo koji preparation method that is carried out at a drier atmosphere and higher temperature should be used to produce koji with high saccharifying power and light koji flavor.

(2) Preparing Koji-Saccharified Syrup

The koji obtained in step (1) is mixed with water and heated for a period of time to initiate saccharification, and then the liquid syrup is separated from the solid residue. The liquid syrup recovered is the koji-saccharified syrup (15–30° Brix).

The temperature and length of time for saccharification are adjustable. The saccharification can be conducted at 30° C. for 12–24 hours, but should be preferably performed at a higher temperature (above 50° C.) to shorten the saccharification time to 2–6 hours, depending upon the saccharifying power of the koji and the desired sugar content of the saccharified syrup.

(3) Preparing Fermenting Mash

The 15–30° Brix koji-saccharified syrup is mixed with soybean protein. The mixture is sterilized to inactivate the protease in the koji. The resultant syrup and protein mixture thus obtained is ready to support the growth and fermentation of the lactic acid bacteria. The soybean protein is preferably added to the koji-saccharified syrup at a weight ratio of 5–10 wt %.

The amount of soybean protein added is based on the desired protein content of the final product. Preferably, the protein concentration of the final product is 1.5–4.0 g/100 g product, which is equivalent to that of milk yogurt.

(4) Lactic Acid Fermenting Mash; and

A variety of publicly known yogurt fermentation starters (commercially available freeze-dried lactic acid starter powder) may be added to the fermenting mash obtained form step (3) to effect fermentation. The conditions for fermentation may vary with the types of the bacterium species and the amount of inoculation. Generally, the amount of lactic acid bacteria inoculation is at a ratio of 3–5% of the volume of the fermenting mash. If a commercially available lactic acid bacteria powder is used, the mash is inoculated in an amount as suggested. Preferably, *Streptococcus thermophillus* and *Lactobacillus bulgaricus* may be used. When the combination of the foregoing two species is used in a 2–4% concentration, the fermentation may be terminated after cultivation for 4–8 hours at a temperature of 37–45° C.

(5) Flavoring the Fermented Product

The lactic acid fermented product resulting form step (4) has a pH value below 4.5 and a total acidity of 0.5–2%. The product possesses a sour taste and its sugar/acid ratio may be adjusted either by the addition of 15–30° Brix koji-saccharified high-sugar syrup or by the addition of oligosaccharides or organic acids. If koji-saccharified high-sugar syrup is used, it should be sterilized at 80–90° C. for 5–10 minutes before it is added to the lactic acid fermented product. To promote product stability and produce a product with various flavors, a variety of food stabilizing agents (e.g. CMC, pectin, etc.) and natural food essences (e.g. strawberry, blueberry, peach, apple, etc.) may be added to the product just like it is usually done with yogurt.

All of the literature and publications as recited in the context of the present disclosure are incorporated herein by reference.

Other features and advantages of the present invention will be apparent from the following description of the preferred embodiments and from the claims.

EXAMPLES

The following examples illustrate various aspects of the present invention but do not limit the claims in any manner whatsoever.

Example 1

Preparation of Peka Lactic Acid Beverage (1) The Preparation of Peka

Potato chunks that have been sterilized were inoculated with spores of *Rhizopus oryzae* ATCC 56536. The inoculated potato chunks were cultivated at about 30° C. for 5–7 days until the chunks were full of spores, and the chunks were used as seed koji. The cultivated potato chunks were washed with aseptic water, and the suspension having spore concentration at above $10^{10}$ spores/ml was collected. The steamed rice was inoculated with the suspension at a volume that gave an inoculation amount of 200 spores per kg of raw rice and then cultivated at 32° C. for 40 hours to produce peka that was full of white mycelium.

(2) The Preparation of Koji-Saccharified Syrup 2 kg peka and 3 liters water were mixed and heated at 30° C. for 24 hours to effect a saccharification. Then, the liquid syrup was separated from the solid residue and the recovered liquid syrup was koji-saccharified syrup with a high-sugar content (20° Brix).

(3) The Preparation of the Soybean Lactic Acid Beverage 30 g isolated soybean protein (ISP) was added to 500 ml koji-saccharified syrup. The resulting mixture was diluted with water to attain a sugar content of 10° Brix, followed by sterilization at 105° C. for 15 minutes (or ultra heat sterilization). The resultant sterilized mixture was inoculated with lactic acid bacteria YC-380 (CHR HANSEN) and cultivated at 42° C. for 8 hours to form a cultivated product. 3 g pectin and koji-saccharified syrup (20° Brix) were mixed to form a 1 liter sweet solution, and the sweet solution was heated to dissolve the pectin and then held at 80° C. for 5 minutes. The cultivated product and the sweet solution were mixed at a ratio of 1:1, then subjected to homogenization using a high pressure homogenizer. The homogenized mixture was packaged in a container and stored in cold. A fermented soybean beverage having a flavor similar to that of sweet fermented rice was thus obtained.

Example 2

Rice Koji Lactic Acid Beverage (1) The Preparation of Rice Koji

The rice that has been soaked in water and sterilized was inoculated with spores of *Aspergillus oryzae* ATCC 9362. The inoculated rice was cultivated at about 30° C. for 5–7 days until the rice was full of spores, and the rice was used as seed koji. The cultivated rice was washed with aseptic water, and the suspension having a concentration at above $10^{10}$ spores/ml was collected. The steamed rice was inoculated with the suspension at a volume that gave an inoculation amount of 50 spores per kg of raw rice and then cultivated at a temperature of 38° C. and a relative humidity below 90% for 45 hours to obtain gin-njio koji that had a light koji flavor and a high saccharifying power.

(2) The procedures in steps (2) and (3) of Example 1 were followed except the peka in step (2) was substituted with rice koji. A fermented soybean beverage with a flavor similar to sake was thus obtained.

Example 3

Anka Lactic Acid Beverage (1) The Preparation of Anka (a) Steamed rice was inoculated with *Monascus purpureus* ATCC 16358 at an inoculation amount to result in 100 spores/kg raw rice. The inoculated rice was cultivated at about 30° C. for 5 days until the steamed rice turned a deep red color. The colored rice was used as seed koji. (b) The seed koji was uniformly mixed with steamed rice at a ratio of 3% by weight based on the weight of steamed rice. At a temperature of 35° C. and a relative humidity below 95%, the resulting mixture was soaked in water twice and cultivated for 6 days to produce anka with a bright red color.

(2) The procedures in steps (2) and (3) of Example 1 were repeated except that the peka in step (2) was substituted with anka. A fermented soybean beverage having a natural red pigment color was thus obtained. This beverage was flavored with strawberry essence to make a product having strawberry flavor and exhibiting a bright red color.

Example 4

Low-Sugar Juice Beverage (1) The Preparation of Koji-Saccharified Syrup

The procedures for preparing koji-saccharified syrup as described in Example 1, 2 and 3 were followed to produce koji-saccharified high-sugar syrup.

(2) Low-Sugar Beverage

The concentrated juice was blended with koji-saccharified high-sugar syrup, juice bases (emulsified essences, pigments, etc.), preservatives and water to make a product having a final sugar content of 5%. The solution was homogenized using a high pressure homogenizer, sterilized at high temperature, bottled at 85° C., sealed and cooled, so that the low-sugar juice beverage was obtained.

Example 5

Healthy Vinegar Beverage (1) The Preparation of Koji-Saccharified Syrup

The procedures for preparing koji saccharified syrup as described in Example 1, 2 and 3 were followed to produce koji-saccharified high-sugar syrup.

(2) Healthy Vinegar Beverage

Rice vinegar containing 6% acetic acid, apple juice and koji-saccharified high-sugar syrup were mixed at a ratio of 2:1:1. The final sugar content of the mixture was adjusted to 8% and the healthy vinegar beverage was obtained.

Various modifications and variations of the present invention will be apparent to those persons skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method for producing a vegetarian lactic acid beverage, which comprises the steps of:
    inoculating steamed rice with edible mold to form koji, mixing the koji with water to effect a saccharification and the separating the liquid syrup from the solid residue to obtain a 15–30° Brix koji-saccharified high-sugar syrup;
    mixing the koji-saccharified high-sugar syrup with soybean protein and sterilizing the syrup and protein mixture; and
    adding lactic acid bacteria to ferment the sterilized mixture;
    optionally adding oligsaccharides, additional 15–30° Brix koji-saccharified high-sugar syrup, food stabilizing agents or essences for flavoring.

2. The method according to claim 1, where the edible mold is selected from genus Aspergillus, genus Rhizopus or genus Monascus.

3. The method according to claim 2, wherein the Aspergillus species is *Aspergillus oryzae;* the Rhizopus species is *Rhizopus oryzae;* and the Monascus species is *Monascus purpureus.*

4. The method according to claim 1, where said saccharification is preformed at 30° C. for 12–24 hours or at a higher temperature of above 50° C. for 2–6 hours.

5. The method according to claim 1, where the lactic acid fermentation is conducted at 37–45° C. for 4–8 hours using a 2–4% concentration of *Streptococcus thermophillus* and *Lactobacillus bulgaricus.*

6. The method according to claim 1, wherein the soybean protein is selected from isolated soybean protein, defatted soybean flour or concentrated soybean protein and the amount added to the syrup is 5–10% by weight based on the weight of the koji-saccharified syrup.

* * * * *